(12) United States Patent
Stolzer et al.

(10) Patent No.: US 10,576,559 B2
(45) Date of Patent: Mar. 3, 2020

(54) SAWING MACHINE FOR SAWING METAL WORKPIECES

(71) Applicant: KEURO BESITZ GMBH & CO. EDV-DIENSTLEISTUNGS KG, Achern (DE)

(72) Inventors: Armin Stolzer, Baden-Baden (DE); Andre Sabel, Drusenheim (FR)

(73) Assignee: KEURO BESITZ GMBH & CO. EDV-DIENSTLEISTUNGS KG, Achern (DE)

( * ) Notice: Subject to any disclaimer, the term of this patent is extended or adjusted under 35 U.S.C. 154(b) by 80 days.

(21) Appl. No.: 15/897,960

(22) Filed: Feb. 15, 2018

(65) Prior Publication Data

US 2018/0169775 A1   Jun. 21, 2018

Related U.S. Application Data

(63) Continuation of application No. 14/706,400, filed on May 7, 2015, now abandoned.

(30) Foreign Application Priority Data

May 7, 2014   (DE) .......................... 10 2014 208 535

(51) Int. Cl.
| | | |
|---|---|---|
| *B23D 47/04* | (2006.01) | |
| *B23D 55/04* | (2006.01) | |
| *B23D 59/00* | (2006.01) | |

(52) U.S. Cl.
CPC ......... *B23D 47/042* (2013.01); *B23D 55/043* (2013.01); *B23D 59/001* (2013.01); *Y10T 83/536* (2015.04); *Y10T 83/758* (2015.04)

(58) Field of Classification Search
CPC ...... B23D 47/00; B23D 47/02; B23D 47/025; B23D 47/04; B23D 47/042; B23D 47/045; B23D 55/04; B23D 55/043; B23D 55/046
See application file for complete search history.

(56) References Cited

U.S. PATENT DOCUMENTS

| | | |
|---|---|---|
| 2,932,229 A | 4/1960 | Crane |
| 3,247,949 A | 4/1966 | McDougall |
| (Continued) | | |

FOREIGN PATENT DOCUMENTS

| | | |
|---|---|---|
| DE | 3630908 | 3/1988 |
| EP | 1923663A1 A1 | 5/2008 |
| (Continued) | | |

OTHER PUBLICATIONS

Japanese Office Action dated Dec. 30, 2018, in corresponding Japanese Application No. 2015-094706, with English translation.

*Primary Examiner* — Jason Daniel Prone
*Assistant Examiner* — Richard D Crosby, Jr.
(74) *Attorney, Agent, or Firm* — Volpe and Koenig, P.C.

(57) ABSTRACT

A method for sawing metal workpieces is disclosed. The method includes: controlling the clamping jaws (8) via the machine controller (12) to clamp a workpiece placed on the sawing bench (2); inputting an offset value into the machine controller (12); advancing or retracting the clamping jaws (8) in order to move the workpiece into a zero position using the offset value, opening the clamping jaws (8), moving the clamping jaws (8) to an initial position, re-clamping the workpiece located in the zero position, the clamping jaws (8) being in their initial position, and moving the clamped workpiece from the zero position into a cutting position by (Continued)

way of a feeding movement, the cutting position being a position in which that point of the workpiece is located in the cutting plane (7).

3 Claims, 1 Drawing Sheet

(56) References Cited

U.S. PATENT DOCUMENTS

| | | | |
|---|---|---|---|
| 3,810,404 A | 5/1974 | Stolzer | |
| 3,841,462 A | 10/1974 | Schmidt | |
| 4,342,240 A | 8/1982 | Gaiser et al. | |
| 4,463,845 A * | 8/1984 | Harris | B65G 43/08 |
| | | | 198/341.02 |
| 5,060,547 A | 10/1991 | Moriya et al. | |
| 5,156,077 A | 10/1992 | Stursberg | |
| 5,680,936 A | 10/1997 | Beers | |
| 5,944,477 A * | 8/1999 | Shill | B65H 31/34 |
| | | | 198/345.1 |
| 6,698,159 B2 * | 3/2004 | Harris | B23D 47/04 |
| | | | 83/247 |
| 6,739,228 B1 * | 5/2004 | Magnuson | B23D 36/0016 |
| | | | 83/209 |
| 7,073,420 B2 * | 7/2006 | Kuo | B23D 17/06 |
| | | | 83/112 |
| 7,111,720 B1 * | 9/2006 | Harris | B23D 55/04 |
| | | | 198/345.1 |
| 7,143,676 B2 * | 12/2006 | Jourdan | B23D 47/042 |
| | | | 83/412 |
| 8,291,799 B2 | 10/2012 | Graushar | |
| 8,397,390 B2 | 3/2013 | Wilbert | |
| 8,555,762 B1 * | 10/2013 | Jones | B23Q 16/001 |
| | | | 83/471.3 |
| 8,893,873 B1 * | 11/2014 | Harris | B65G 19/00 |
| | | | 198/345.1 |
| 2003/0000358 A1 * | 1/2003 | Harris | B23D 47/04 |
| | | | 83/247 |
| 2004/0117058 A1 | 6/2004 | Dick et al. | |
| 2005/0061122 A1 | 3/2005 | Behringer | |
| 2006/0060043 A1 | 3/2006 | Gosis | |
| 2006/0090623 A1 * | 5/2006 | Diener | B23D 53/04 |
| | | | 83/651 |
| 2007/0006706 A1 | 1/2007 | Watanabe et al. | |
| 2007/0144320 A1 | 6/2007 | Witte et al. | |
| 2012/0060662 A1 | 3/2012 | Hinshaw | |
| 2012/0297949 A1 * | 11/2012 | Ono | B23D 47/04 |
| | | | 83/169 |
| 2014/0174268 A1 | 6/2014 | Sale | |
| 2014/0360324 A1 | 12/2014 | Tokiwa | |

FOREIGN PATENT DOCUMENTS

| | | |
|---|---|---|
| EP | 2253403 | 11/2010 |
| JP | S5557401 U | 4/1980 |
| JP | S55157424 A | 12/1980 |
| JP | 5867620 U | 5/1983 |
| JP | H01295711 A | 11/1989 |
| JP | H03107127 U | 11/1991 |
| JP | H04189417 A | 7/1992 |
| JP | H05-309518 A | 11/1993 |
| JP | H10-272601 A | 10/1998 |
| JP | H11-083482 A | 3/1999 |
| JP | 2007-015078 A | 1/2007 |
| JP | 2008-122228 A | 5/2008 |

* cited by examiner

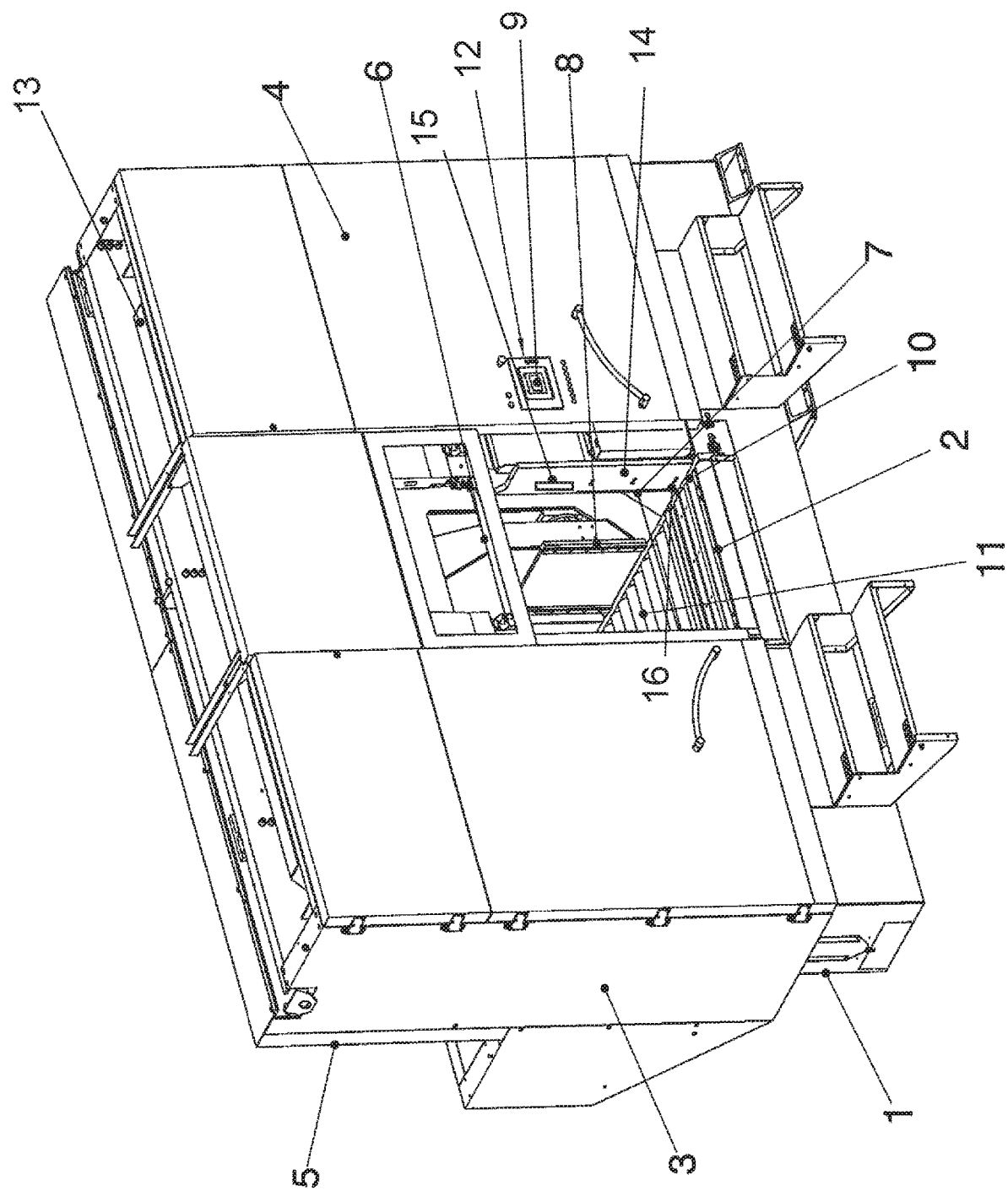

SAWING MACHINE FOR SAWING METAL WORKPIECES

CROSS REFERENCE TO RELATED APPLICATIONS

This application is a continuation of U.S. patent application Ser. No. 14/706,400, filed May 7, 2015, which claims priority to DE 10 2014 208 535.7, filed May 7, 2014, which are incorporated by reference as if fully set forth.

BACKGROUND

The invention relates to a sawing machine for sawing metal workpieces. Such a sawing machine comprises a machine frame and an upper saw part attached to the machine frame, said upper saw part carrying a sawing tool which is driven so as to generate a material-removing sawing movement. The upper saw part is movable relative to the sawing bench in order to execute a sawing feeding movement, extending in a cutting plane, of the sawing tool. The machine frame comprises a sawing tool and clamping jaws, which are movable back and forth, for positioning workpieces on the sawing bench. The sawing machine is finally also provided with a machine controller for controlling the movement sequences.

Sawing machines of the present type are generally realized as band sawing machines or circular sawing machines. The sawing tool can accordingly be a sawing band or a saw blade.

Metal workpieces which are sawn by way of sawing machines of the present type are generally so heavy that they cannot be placed manually on the sawing bench. Rather, they are supplied to the sawing bench by conveying means. For the actual sawing operation, the workpieces are clamped in the clamping jaws at the sawing bench and then the upper saw part is lowered in order to carry out the desired sawing cut.

The clamping jaws of a sawing machine of the present type are movable back and forth in order to position the workpieces for the sawing operation. At the beginning of a sawing operation, the clamping jaws carry out an advancing movement by a length which corresponds to the length of the workpiece part to be sawn off. Accordingly, at the beginning of a sawing operation, the workpiece has to be positioned in a zero position in which a front end side of the workpiece is located in the cutting plane. This is because it is only then that the advancing movement of the clamping jaws results in the cutting plane extending at the desired distance from the end side of the workpiece in order to saw off a part of the workpiece with the desired thickness. The machine controller of a sawing machine of the present type accordingly actuates the clamping jaws such that they clamp the workpiece in the zero position in which the front end side of the workpiece is located in the cutting plane, and move the clamped workpiece by way of a feeding movement from the zero position into a cutting position in which that point of the workpiece at which the workpiece is intended to be sawn off is located in the cutting plane.

The difficulty is thus that of moving the workpiece as precisely and yet quickly as possible into the zero position in the sawing machine when said workpiece is supplied to the sawing bench, in order to be able to begin the sawing operation.

A known possibility for solving this problem utilizes positioning a stop in the cutting plane, the workpiece butting against said stop when it is supplied such that as a result its end side comes to lie in the cutting plane. A disadvantage here is that the stop has to be removed for the sawing operation since otherwise a feeding movement into the cutting position would not be possible. At the same time, the stop has to be formed in a very resistant manner in order to be able to withstand the impulse of the butting workpiece. Finally, the workpiece has to be slowed down before the stop in order not to rebound at the stop on account of an elastic impact.

Another known solution to this problem utilizes detecting the end side of the workpiece by means of sensors on its way to the cutting plane and reporting this to the machine controller such that the latter can brake the workpiece in a timely manner before it reaches the cutting plane, and the workpiece finally remains in the zero position. In addition to the complexity which such a sensor system causes, it has been found that corresponding sensors are very susceptible to faults in the harsh environment of a sawing machine of the present type and have to be replaced frequently. This solution is therefore not optimal on account of the additional costs and on account of poor reliability.

A third known solution to the stated problem requires providing merely one sensor, specifically a light barrier, in the cutting plane and to convey the workpiece by eye into the sawing machine and onto the sawing bench, wherein the end side of the workpiece is conveyed beyond the cutting plane and thus the zero position. Then, the workpiece is clamped in the clamping jaws and the clamping jaws moved back until the light barrier arranged in the cutting plane has been cleared by the workpiece. At this moment, the movement is stopped, and so the zero position of the workpiece is reached, since at the moment at which the light barrier is cleared, the end side of the workpiece is located in the cutting plane.

A light barrier arranged in the cutting plane is very much less susceptible to faults than a complicated sensor system for controlling the conveying movement when conveying the workpiece into the sawing machine, but the constituent parts of the light barrier, which necessarily have to be arranged within the sawing machine, are also exposed to the harsh environmental conditions during operation of the sawing machine and accordingly likewise cannot always be operated in a reliably fault-free manner.

SUMMARY

Therefore, the present invention is based on the object of providing a sawing machine of the type mentioned at the beginning, in which the zero position of the workpiece on the sawing bench can be set without the known sensors and without a stop.

This object is achieved by a sawing machine having one or more features of the invention. Preferred configurations of the sawing machine according to the invention are described below and in the claims.

The machine controller of a sawing machine of the type mentioned at the beginning is thus configured according to the invention such that it clamps a workpiece placed on the sawing bench in the clamping jaws and then waits for the input of an offset value which corresponds to the distance of the front end side of the workpiece from the zero position. Only then is the workpiece moved into the zero position by advancing or retracting the clamping jaws, taking into consideration the offset value, and re-clamped if necessary. It is then possible to start a feeding movement into the cutting position for the sawing operation.

An offset value can be input into the machine controller in the simplest case by the operator of the sawing machine. This person moves the workpiece by eye into the sawing machine, specifically into a position on the sawing bench which corresponds approximately to the zero position. Then, the workpiece is clamped in the clamping jaws. The operator can then determine the distance between the end side of the workpiece and the cutting plane, for example by means of a folding rule, and input said distance manually as an offset value into the machine controller such that the latter can then move the workpiece into the zero position.

Preferably, the sawing bench and/or one of the clamping jaws or a lateral stop for the workpiece is provided with a millimeter and/or inch scale, the zero point of which is located in the cutting plane. The operator can then read the offset value without having to use a folding rule and without any parallax, and input it into the machine controller. With such a scale, reading errors and handling errors, which are not uncommon when using a folding rule, are avoided.

Finally, provision can also be made, in the context of the present invention, for the sawing bench and/or one of the clamping jaws or a lateral stop face 14 for the workpiece to be provided with an automatically readable scale and for the automatically readable scale value to be reported automatically as offset value to the machine controller, in particular via a radio link. This automatic reading can by carried out by a laser 15 or by an inductive device 16 or the like.

Preferably, in the context of the present invention, the end side of the workpiece is moved beyond the zero position when said workpiece is conveyed into the sawing machine, such that the offset value is a negative value which results in the workpiece being retracted into the zero position. However, in the context of the present invention, it is equally possible to convey the workpiece until just before it reaches the zero position and to input a positive offset value into the machine controller, such that the latter moves the clamped workpiece into the zero position by way of a feeding movement.

BRIEF DESCRIPTION OF THE DRAWINGS

An exemplary embodiment of a sawing machine configured in accordance with the invention is explained and described in more detail in the following text with reference to the appended drawing.

The single FIG. 1 shows a perspective view of a sawing machine which is configured in accordance with the present invention.

DETAILED DESCRIPTION OF THE PREFERRED EMBODIMENTS

FIG. 1 shows the sawing machine which comprises a machine frame 1 having a sawing bench 2 and side panels 3, front panels 4 and rear-side panels 5 which prevent access to moving parts of the sawing machine for safety reasons. Arranged behind these panels is an upper saw part 13 which has two (not visible) running wheels about which a sawing band runs as sawing tool 6. In the present illustration, the upper saw part 13 is located with the sawing tool 6 in its highest possible position; by lowering the upper saw part 13 and thus the sawing tool 6, the latter is moved toward the sawing bench 2 in a cutting plane 7, such that a workpiece (not illustrated) resting on the sawing bench 2 is sawn off in the cutting plane 7. The cutting plane 7 simultaneously marks the zero position of the workpiece, since an end side of the workpiece is located in the cutting plane 7 in the zero position.

In the region of the sawing bench 2, clamping jaws 8, which are movable back and forth, are fitted behind the cutting plane 7 in order to be able to position the workpiece. Like all the other moving parts of the cutting machine, the clamping jaws 8 are controlled by a machine controller 12. The machine controller 12 can be operated via a control panel 9.

A length scale 10 is engraved in the region of the sawing bench 2; in the present case only in front of the cutting plane 7.

In order to be able to begin a sawing operation on a new workpiece, an operator has to use the control panel 9 to move a workpiece into the sawing machine using a roller conveyor 11 and thus to bring it to a stop on the sawing bench by eye, such that the end side of the workpiece comes to lie in front of the cutting plane 7, specifically in the region of the length scale 10. Then, the workpiece is clamped by way of the clamping jaws 8.

An offset value which the operator inputs into the machine controller 12 via the control panel 9 can be read from the length scale 10. The machine controller 12 then retracts the clamping jaws 8 by the offset value such that the end side of the workpiece is located in the cutting plane 7 and the zero position of the workpiece is achieved. The machine controller 12 then re-clamps the workpiece and moves the workpiece into the cutting position selected by the operator by way of a feeding movement such that, as a result of a lowering movement of the sawing tool 6, a part of the workpiece is sawn off to the desired length.

The invention claimed is:

1. A method for sawing metal workpieces using a sawing machine comprising a machine frame (1) including a sawing bench (2), clamping jaws (8), which are movable back and forth, for positioning a workpiece on the sawing bench (2), an upper saw part attached to the machine frame (1), movable relative to the sawing bench (2) in order to generate a sawing feeding movement extending in a cutting plane (7), a sawing tool (6) which is driven so as to generate a material-removing sawing movement on the upper saw part, and a machine controller (12) for controlling movement sequences, the method comprising:
controlling the clamping jaws (8) via the machine controller (12) to clamp a workpiece placed on the sawing bench (2), the clamping jaws (8) being located in an initial position,
inputting an offset value into the machine controller (12), the offset value corresponding to a distance of a front end side of the workpiece from a zero position, the zero position being a position in which the front end side of the workpiece is located in the cutting plane (7),
advancing or retracting the clamping jaws (8) in order to move the workpiece into the zero position using the offset value,
opening the clamping jaws (8),
moving the clamping jaws (8) to the initial position,
re-clamping the workpiece located in the zero position, the clamping jaws (8) being in their initial position,
moving the clamped workpiece from the zero position into a cutting position by way of a feeding movement, the cutting position being a position in which that point of the workpiece is located in the cutting plane (7).

2. The method according to claim 1, wherein at least one of the sawing bench (2), the clamping jaws (8), or a lateral stop face on the sawing bench (2) is provided with a length scale (10), and wherein the position of the front end side of the workpiece is detected by a sensor which corresponds to the offset value.

3. The method according to claim 2, wherein a sawing machine is used in which the length scale (10) is engraved.

\* \* \* \* \*